United States Patent [19]

Morozumi

[11] Patent Number: 4,653,862
[45] Date of Patent: Mar. 31, 1987

[54] LIQUID CRYSTAL DISPLAY DEVICE HAVING COLOR FILTERS SIZED TO PREVENT LIGHT LEAKAGE BETWEEN PIXELS

[75] Inventor: Shinji Morozumi, Suwa, Japan

[73] Assignee: Seiko Epson Corporation, Tokyo, Japan

[21] Appl. No.: 818,470

[22] Filed: Jan. 13, 1986

Related U.S. Application Data

[62] Division of Ser. No. 472,358, Mar. 4, 1983, Pat. No. 4,600,274.

[30] Foreign Application Priority Data

Oct. 1, 1982 [JP] Japan ................. 57-173513

[51] Int. Cl.[4] .............................................. G02F 1/13
[52] U.S. Cl. ..................... 350/339 F; 350/339 R; 350/333
[58] Field of Search ............... 350/333, 339 R, 339 F

[56] References Cited

U.S. PATENT DOCUMENTS 3,840,695 10/1974 Fischer ........................... 358/61
4,006,968 2/1977 Ernstoff et al. ................ 350/339 F
4,294,524 10/1981 Stolov ............................. 350/333 X
4,396,251 8/1983 Mukoh et al. ............... 350/339 F X
4,410,887 10/1983 Stolov et al. ................ 350/339 F X
4,413,883 11/1983 Baraff et al. .................. 350/333 X
4,448,491 5/1984 Okubo ........................ 350/339 R X
4,593,977 6/1986 Takamatsu et al. ............ 350/339 F
4,600,274 7/1986 Morozumi ................. 350/339 R X

FOREIGN PATENT DOCUMENTS 0023421 2/1981 European Pat. Off. ........ 350/339 F
0022898 2/1977 Japan ............................ 350/339 F
0025174 3/1981 Japan ............................ 350/339 F
0186737 11/1982 Japan ............................ 350/339 F Primary Examiner—John K. Corbin
Assistant Examiner—Richard F. Gallivan
Attorney, Agent, or Firm—Blum Kaplan Friedman Silberman & Beran

[57] ABSTRACT

A multi-color liquid crystal display includes liquid crystal micro-shutters which open and close color filters arranged as dots in a mosaic or stripe pattern. Fine and clear color image display and color graphic display are realized in the device wherein the filters are within the LCD panel, being formed on one substrate and covered by the driving electrode.

28 Claims, 36 Drawing Figures

FIG.22a
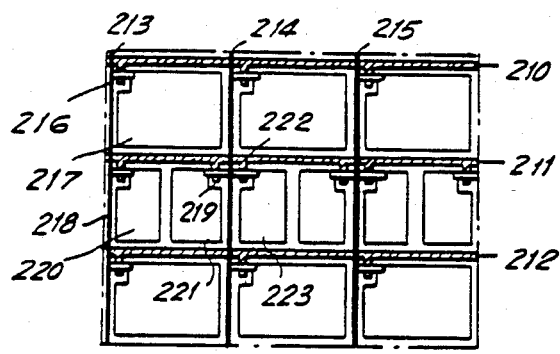
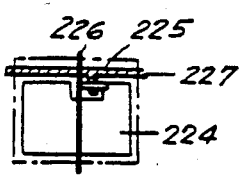
FIG.22b
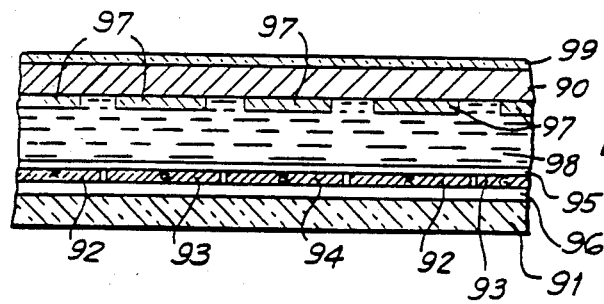
FIG.27
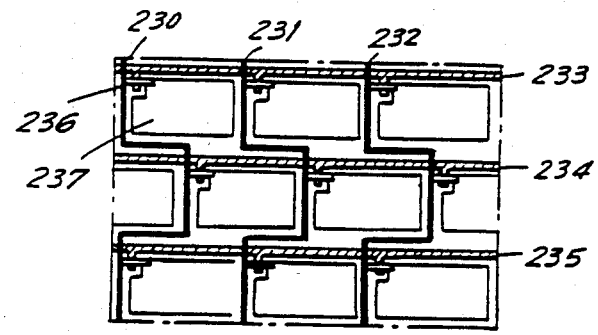
FIG.23

LIQUID CRYSTAL DISPLAY DEVICE HAVING COLOR FILTERS SIZED TO PREVENT LIGHT LEAKAGE BETWEEN PIXELS

This is a division, of application Ser. No. 06/472,358 filed Mar. 4, 1983, now U.S. Pat. No. 4,600,274.

BACKGROUND OF THE INVENTION

This invention relates to a liquid crystal display device and more particularly to a liquid crystal display for colored picture images and color graphics. Heretofore, it has not been possible to realize a practical liquid crystal display device with a multi-color display for the following reasons. First, the prior art was not capable of enlarging the number of dots or lines in the liquid crystal panel. These devices were limited at most to a 1/16 duty cycle ratio and thus, sixteen lines in a conventional multiplex driving system. On the other hand, a color display system requires at least a hundred lines and accordingly, 1/100 duty cycle ratio must be achieved for driving a color liquid crystal device.

Second, it has not been possible to have a superior medium for multi-colored display in using a liquid crystal device. For example, it is extremely difficult to achieve a multi-color display using only one substrate when coloring materials are included in the liquid as in guest-host liquid crystals. Also, it is very expensive to superimpose panels having different color compositions and such a multi-panel construction cannot realize a fine quality color display. Also, viewing angle is extremely limited if a color filter is used outside the liquid crystal panel.

For these reasons it has been difficult to produce a practical liquid crystal panel with a multi-color display.

What is needed is a multi-color liquid crystal display which is economical to produce and provides high quality color picture images and graphics.

SUMMARY OF THE INVENTION

Generally speaking, in accordance with the invention, a liquid crystal display especially suitable for providing images and graphics in multi-color is provided. Three systems for increasing the duty cycle ratio are disclosed. A very high duty cycle ratio, in the order of 1/60 to 1/200 is achieved in a multiplex driving system as a result of and using exceptional construction techniques for the liquid crystal panel. The liquid crystal electrodes are switched by means of active matrix elements such as transistor switches, and non-linear elements such as a diode or MIM element. The multi-color liquid crystal display in accordance with the invention includes negative liquid crystal micro-shutters which open and close color filter dots arranged in a mosaic or stripe pattern as the technique for producing a superior color display device. The filter is within the display panel. Fine and clear color image display and color graphic display are realized in the liquid crystal display device in accordance with the invention.

Accordingly, it is an object of this invention to provide an improved liquid crystal display device of simple construction capable of producing color images and graphics of high quality.

Another object of this invention is to provide an improved color liquid crystal display device which has good resolving power and clearness.

A further object of this invention is to provide an improved liquid crystal display which operates with a very high duty cycle ratio and allows for a display of at least a hundred lines.

Still other objects and advantages of the invention will in part be obvious and will in part be apparent from the specification.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 22a, b, FIG. 23, FIG. 24 and FIG. 25 illustrate the use of a thin-filmed transistor in a high resolution picture element construction in accordance with the invention.

FIG. 27 is a view similar to FIG. 9a of an alternative embodiment of a liquid crystal display device in accordance with the invention.

DESCRIPTION OF THE PREFERRED EMBODIMENTS

Figure 1:
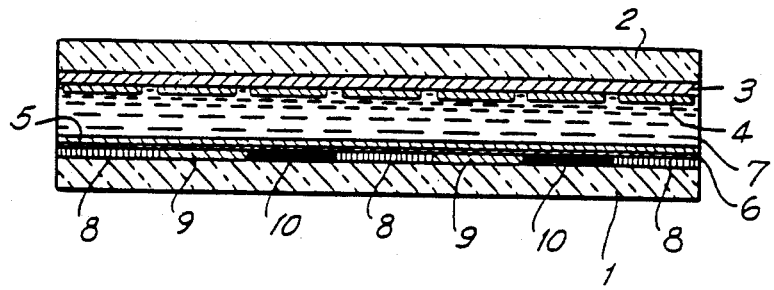
FIG. 1 is a cross-sectional view of a liquid crystal display device in accordance with the invention.

FIG. 1 illustrates a basic structure of a liquid crystal display device in accordance with the invention. Three different types of color filters are formed on a glass substrate 1, for example, red filter 8, green filter 9 and blue filter 10 are formed as a mosaic or stripe pattern. A passivation layer 6, for example, SiO2, is formed on these color filters, and a transparent electrode 5, serving as a liquid crystal driving electrode is formed on the passivation layer 6. There is also a construction where the passivation layer 6 can be omitted as described hereinafter. Opposed to the electrode 5 is a device layer 3 on which switching elements or non-linear elements are arranged. The device layer 3 is formed on a glass substrate 2 and transparent electrodes 4 are formed on the device layer 3 in correspondence with every color filter dot 8, 9, 10 for driving the liquid crystal.

With both of the above described glass substrates 1, 2 positioned in opposition, a liquid crystal material 7 is encapsulated in the space between the glass substrate 1 and the glass substrate 2 by sealing around the periphery of the glass substrates.

In a transparent type of display panel, light is introduced from beneath the glass substrate 1 through a polarizer. Light having a fixed wavelength corresponding to a predetermined color is transmitted through color filters 8, 9 and 10 by opening the transparent electrode 4. Light is not transmitted at a dark portion of the liquid crystal wherein voltage is not supplied to the electrode 4 of the liquid crystal. Light having a wavelength corresponding to the color filter is transmitted only at the transparent portions of the liquid crystal wherein voltage is supplied to the electrodes of the three primary colors to yield seven colors for graphic display. Further, various degrees of luminance levels of full colors are realized by adopting a gray scale display function which controls semi-transparent states of the liquid crystal 7.

Figure 2:
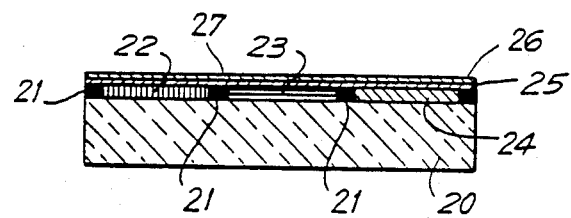
FIGS. 2 and 3 show details in construction of a color filter used in the liquid crystal display device of FIG. 1.

Further details of the construction of FIG. 1 follow. FIG. 2 shows a structural example of a color filter. A water soluble organic resin layer, for example polyvinyl alcohol, gelatine, or the like, is formed on a transparent glass substrate 20. Then, the water soluble organic layer is colored with coloring materials of red, blue and green by printing these coloring materials in an arrangement having a predetermined pattern. As a result, each color filter is formed so as to be arranged in correspondence to each transparent electrode 4 (FIG. 1). In FIG. 2, the color filter includes red portions 22, blue portions 23 and a green portion 24. In addition, a black frame 21 is provided between the color filters by coloring the boundary of each primary color with a black pigment in order to avoid blurring of the color at the filter boundaries. However, a black frame 21 is not required when the colored layer, such as gelatine, and the like is etched off. In the case of a negative type liquid crystal, an inhibitor of coloring must be included in the black frame 21 instead of a black coloring material when the coloring power of the coloring material is strong in the lateral direction.

Next, a transparent passivation film 25 is formed on the color filter and then a transparent conductive electrode 26 is formed on the passivation film 25 for driving the liquid crystal. This electrode 26 is photoetched to obtain the necessary pattern, thus, a lower electrode portion is formed. There is a construction where the transparent electrode 26 is formed directly onto the color film without the passivation filter 25. In this construction, the transparent film 26 also functions as a passivation film.

Figure 3:
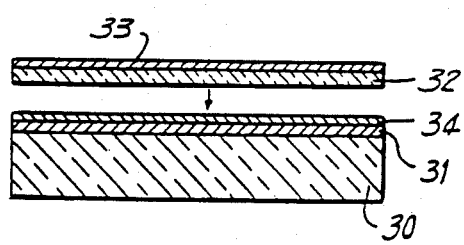

The coloring materials in the color filters 22, 23, 24 may be deteriorated or damaged when the transparent conductance film 26 is formed. This disadvantage is avoided by forming the passivation layer. With reference to FIG. 3, this disadvantage can be avoided by forming a passivation layer 34 on a color filter 31 or by forming a transparent electrode 33 on a thin glass or plastic film 32 and then adhering the layered structure 32, 33 to the glass substrate 30 having the filters 31 thereon.

Figure 4A:
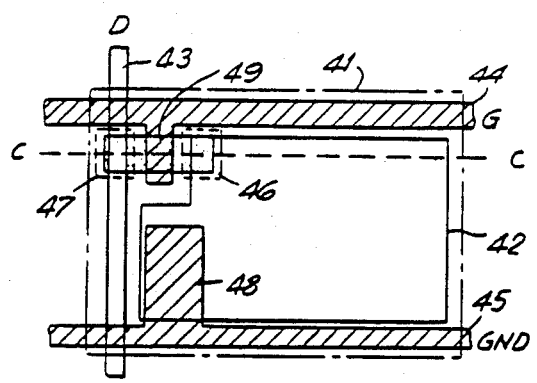
FIGS. 4a, c are top and side sectional views of an active matrix base substrate in accordance with the invention.

FIG. 4 shows an embodiment of an active matrix element constructed on a transparent substrate. This construction has an advantage in that a driving duty cycle greater than 1:00 can be attained and a gray scale display can be easily achieved in this system. FIG. 4 illustrates a silicon thin film transistor on a transparent substrate, such as pyrex, quartz, and the like having a comparatively high melting point. Thus, a thin film transistor is more easily formed on a transparent substrate as compared to forming conventional active matrix elements on a single crystal wafer of silicon. A plan view in FIG. 4a illustrates a cell 41 which is one picture element, that is, one dot in a matrix. A gate line 44 is connected to the gate of a transistor 49 to serve as a selecting line Y, and a data line 43 is connected to the source of the transistor 49 through a contact hole 47 to serve as an X line. An electrode 42 for driving the liquid crystal is connected to the drain of the transistor 49 through a contact hole 46. Also, a capacitor 48 for storing an electrical charge is formed between a ground line 45 and the electrode 42 for driving a liquid crystal material.

Figure 4B:
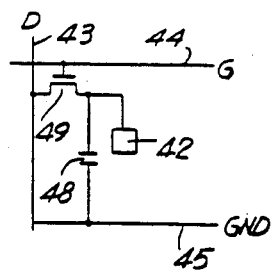
FIG. 4b is an equivalent circuit thereof.

The circuit in FIG. 4b is an electrical equivalent to the construction of the cell 41 in FIG. 4a. When the transistor 49 turns ON, a voltage is applied through the data line 43 to the capacitor 48 and the liquid crystal driving electrode 42. Then, an electrical charge is stored by the capacitor between opposite electrodes, of the capacitor 48 and the driving electrode 42. The electrical charge can be kept for a long time because the current leakage of the transistor 49 and the liquid crystal material is negligibly small. Therefore, a principle duty cycle ratio can be the time of electrical charge retention in the capacitor divided by the time necessary for inputting a data signal. The value of the duty cycle ratio with this construction can be greater than 10,000. However, the capacitor 48 does not require a large area of the liquid crystal driving electrode.

Figure 4C:
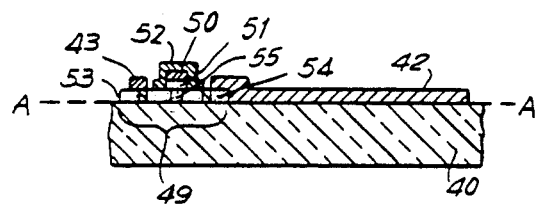

FIG. 4c is a sectional view taken along the line c—c of FIG. 4a. A first thin film layer of a silicon channel region is formed on a transparent substrate 40 by a process of low pressure chemical vapor deposit (CVD), or plasma CVD, after a patterning treatment is performed. An oxidized layer is formed by oxidizing the silicon surface and then, a second film layer of silicon is formed. Then, a gate line and ground line are formed by patterning a second thin film layer of silicon. The oxidized layer is etched by utilizing the second thin film as an etching mask. Thus, a gate insulating film 51 and a gate electrode 50 are formed. A N-layer is formed by implanting positive ions into the first layer of silicon by using the gate 50 as a mask. Thus, the source 53, channel 55 and drain 54 of the transistor are constructed.

After the oxidized layer is deposited, a contact hole is formed and then the data line 43 and liquid crystal electrode 42 are formed by depositing transparent conductive film and patterning the thin film. In this construction, the liquid crystal driving electrode plays the role of a light shutter so that colored light coming from the filter corresponding to the electrode position is transmitted or cut off by the shutter.

Furthermore, a gray scale display is attained by varying light transmittance of the liquid crystal material continuously by controlling the level of input voltage of the data line. This display has a great advantage in realizing full colors which are formed by mixing of the primary three colors while keeping the gray scale levels of the color itself. Another advantage is that a complete color image composed of 500×500 dots in a matrix can be achieved because such a system can operate with an extremely high duty ratio when operating as a point-at-a-time system.

Figure 5A:
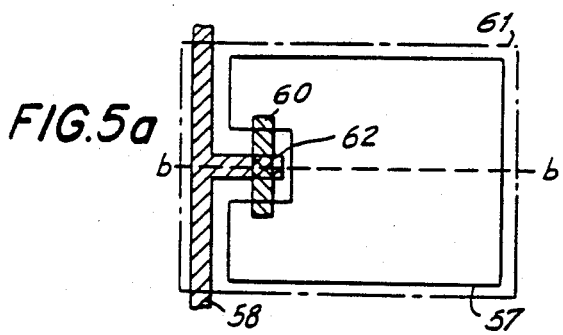
FIG. 5a, b are top and side sectional views of a non-linear element for use in a liquid crystal display device in accordance with the invention.
Figure 5B:
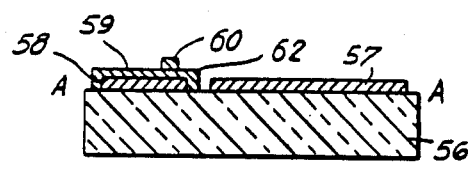

Another means for improving the driving duty cycle of a liquid crystal display in accordance with the invention is to drive the liquid crystal by utilizing a non-linear element such as illustrated in FIGS. 5 and 6. FIG. 5 shows an exemplary construction of a metal-insulator-metal (MIM) element wherein a matrix cell 61 is comprised of a driving electrode 57, MIM element 62 and an X driving line or film 58. This driving electrode 57 is driven by applying a data signal to the electrode 57 by way of the MIM element 62 from the X driving line or film 58, the film 58 of tantalum Ta, is formed by sputtering and then patterning the tantalum film. Further, an oxidized layer of from 300 to 500 angstroms in thickness is formed on the tantalum film 58 anodizing this film. After that, a tantalum layer 60 is formed by sputtering and then patterning the tantalum film so as to be the upper electrode. Then, a transparent driving electrode 57 is formed.

Figure 6A:
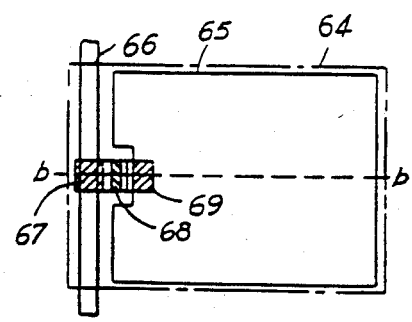
FIGS. 6a, b are top and side sectional views of a non-linear element for use in a liquid crystal display device in accordance with the invention.
Figure 6B:
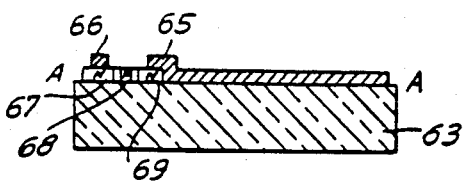

FIG. 6 is an exemplary construction wherein two diodes faced oppositely to each other are connected in series and the X driving line 66 is connected to an electrode 65 through a N type area 67, P type area 68 and N type area 69. FIG. 6b is a sectional view along the line b-b of FIG. 6a and the construction process is as follows. After forming an island of a silicon layer on a transparent substrate 63, N type areas 67, 69 and P type areas 68 are formed through ion implantation. Further, a transparent conductive film is formed and then an X driving line 66 and liquid crystal driving electrode 65 are formed. It should be understood that a PNP construction is also possible.

Figure 7:
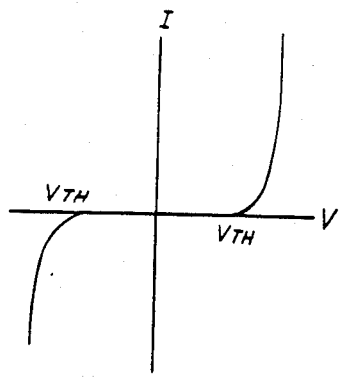
FIG. 7 shows the voltage-current characteristics of a nonlinear element.
Figure 8:
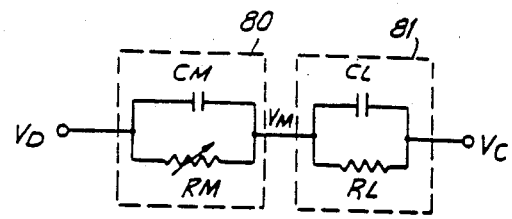
FIG. 8 is an equivalent driving circuit.

A non-linear element constructed by the above described methods show voltage-current characteristics as indicated in FIG. 7 wherein the current increases sharply at a certain level of input voltage. FIG. 8 is an equivalent circuit showing a driving liquid crystal cell 81 and this non-linear element 80. The non-linear element 80 is represented as a non-linear resistance RM and a capacitor CM. The liquid crystal 81 is represented as an equivalent resistance RL and a capacitor CL.

An operating voltage higher than a threshold level is applied to the non-linear element 80 in order to light the liquid crystal when the voltage VM between the crystal cell 81 and nonlinear element 80 is almost equal to the operating voltage VD because the resistor RM is at a low value. Therefore, the voltage VM is substantially applied to the liquid crystal. Thereafter, the resistance RM becomes extremely high when the operating voltage VD is reduced below the threshold level. Then, the voltage VM which is stored in the capacitor CL gradually diminishes by discharging the capacitor CL with a time constant determined by the values of RL and CL. However, a voltage level which lights the liquid crystal can be maintained for a long period of time.

When the liquid crystal is not lit, VM is nearly zero voltage because a lower voltage than the threshold voltage is applied at VD.

Therefore, the voltage VM for lighting the liquid crystal is maintained by the capacitor CL, regardless of voltage level, so that a duty cycle ratio can be increased, which is a similar result as that of the active matrix shown in FIG. 4. In the constructions of FIGS. 5 and 6, the driving electrodes 57, 65 play the role of a light shutter aligned to the color filter.

The advantage of a non-linear element is its simple construction when a simple multiplex driving method of the prior art is available having a duty cycle ratio which is either ¼ or 1/16. The non-linear element is applicable to gray scale display as well as to graphic display. There are two methods of driving a liquid crystal for realizing gray scale display. One is where an active matrix with thin film transistors (TFT) is adapted to a system where continuous gray scale can be achieved by applying voltages corresponding to the contrast level or gray scale to data line D in FIG. 4. The voltages corresponding to the gray scale are obtained by sampling and holding an image signal, that is, a point-at-a-time system.

Another method of driving the liquid crystal for realizing gray scale display is with multiplex driving at a high duty cycle ratio by varying the pulse width of the driving signals. For instance sixteen levels of gray scale can be obtained by dividing a selecting frame into sixteen categories wherein each category means one level of the gray scale. The above-mentioned pulse width modulation system is a line-at-a-time system.

When another liquid crystal panel, in accordance with the invention, that is, wherein a non-linear element is applied, both a line-at-a-time driving system and a point-at-a-time driving system are available for use as described more fully hereinafter.

In summary, in accordance with the invention, a switching element or non-linear element is formed on a glass substrate which constitutes the upper electrode for driving the liquid crystal. Another glass substrate provided with a filter constitutes the lower electrode for driving the liquid crystal. Direct formation of the element on the filter shown in FIG. 2 deteriorates the filter charcteristics and decreases the yield of the filter. There are two ways of avoiding these difficulties, namely, that switching elements are formed on a thin sheet 32 as shown in FIG. 3 and then attached to the lower filter portion. Another way of avoiding these difficulties is by forming the switching elements directly on the glass substrate and the color filter layer is formed on these switching elements.

Figure 9A:
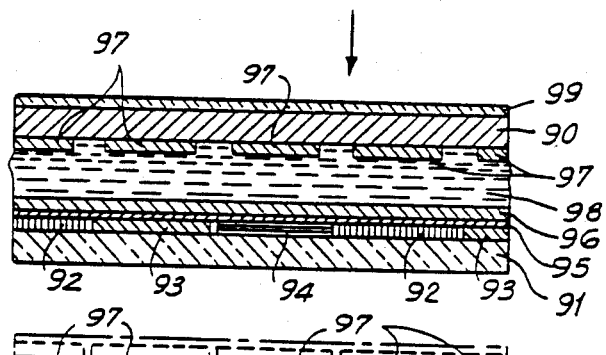
FIGS. 9a–c show the construction of a color display device similar to FIG. 1 in accordance with the invention.

FIG. 9 illustrates an example of a display panel in accordance with the invention. This sectional view in FIG. 9a shows the upper portion to be comprised of a glass substrate 99, switching element portion 90 and driving electrodes 97. The lower portion of the display is comprised of color filters 92, 93, 94 on a glass substrate 91, and a common electrode 96 acting through a passivation layer 95. A liquid crystal layer 98 is inserted between the above described two glass substrates 90, 91 and a polarizing plate is attached to either of the upper or lower portions. Light is applied from an external source through the polarizing plate.

Figure 9B:
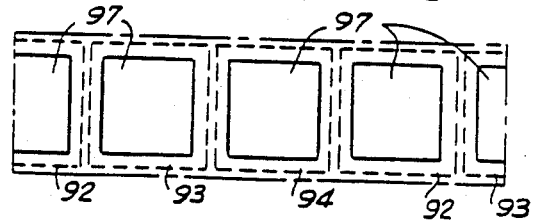
Figure 9C:
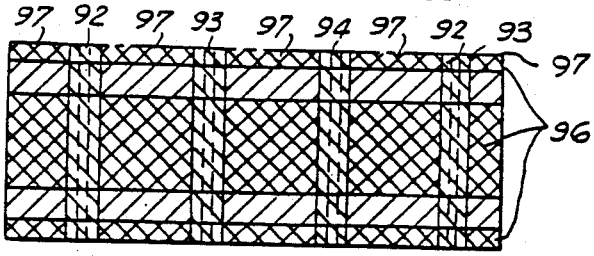

In FIGS. 9a–c the common electrodes 96 are arranged as stripes in the horizontal direction of the Figures. It should be understood that in an alternative embodiment in accordance with the invention the common electrode 96 is one element covering all of the picture elements of a display.

Here there is a problem of light shielding because of gaps existing between color filters or between driving electrodes where light enters these gaps and deteriorates an otherwise beautiful color reproduction. For instance, when light is irradiated from the lower portion, this light leaks away from the gaps between color filters and between driving electrodes even when the liquid crystal shutter is closed.

There are two techniques to counter the above-mentioned problem. One technique uses a negative-type liquid crystal material wherein light cannot be transmitted without applying a voltage. Thereby, a transmittance of light is always shielded through the gaps between the driving electrodes 97. The other technique is to include dark frames in the gaps between color filters as shown in FIG. 2. The use of these counter measures together brings an even more effective result.

Light can become blurred when passing through the liquid crystal material at the time when the shutter is open. For instance, when only a shutter above a red filter 92 is open, light at the edge of the blue filter 94 and green filter 93 leaks from the shutter onto the red filter 92 and the light leakage deteriorates the color image reproduction. To avoid this problem a large area of color filter is preferably adopted as compared with the area of the effective shutter in the liquid crystal. For example, the driving electrode 97 of an active matrix is formed smaller than the mosaic-state filter as illustrated in FIG. 9b.

In FIG. 9c, a view looking through the transparent layers as indicated by the arrow in FIG. 9a, a non-linear element is provided wherein the overlapping portion of the lower common electrode 96 and the upper driving electrode 97 is the effective shutter portion. This area is formed larger than the strip-type color filter or mosaic-type color filter.

In the constructions of a liquid crystal display device in accordance with the invention, described above, the common electrode, for example, electrode 96 of FIG. 9a covers the color filters 92, 93, 94. Because of the transparency of the filters 92, 93, 94, passivation layer 95 and common electrode 96, in an alternative embodiment of a liquid crystal display device in accordance with the invention, the relative positions of the color filters and the common electrode may be reversed as illustrated in FIG. 27. In FIG. 27, which is similar to FIG. 9a and uses the same reference numerals to identify the same elements, the common electrode 96 is adjacent to the glass substrate 91. The passivation layer 95 and color filters 92, 93, 94 cover the common electrode 96 and separate the common electrode from the liquid crystal material 98. The upper portion of the device of FIG. 27 is identical with that of FIG. 9a and the description relevant to FIG. 9c is equally applicable to the construction of FIG. 27.

In the above display system for a color liquid crystal display device in accordance with the invention, it is necessary that the difference of light transmittance between an open stae of the liquid crystal shutter and the closed state of the liquid crystal shutter be large. With respect to a TN display device, which is conventionally used, two polarizing plates are prepared. One is put on the upper side and the other on the lower side of the display panel and the polarizing plates are adjusted to be of the positive type. In this case, the ratio of light transmittance of a shutter is determined by the arrangement of polarizing light plates, and the ratio of parallel direction of polarizing plates to the vertical direction of these plates. As a practical matter, this ratio ranges from 10 to 50.

When using guest-host liquid crystal material, the brightness is twice that compared with TN liquid crystal material, and the transmittance ratio is entirely determined by the liquid crystal materials, and this ratio is relatively large because only one polarizing plate is needed. For instance, generally a guesthost liquid crystal including black coloring material completely cuts off the light, and becomes very transparent when voltage is applied so that the ratio of light transmittance is over 50.

Additionally, a positive-type of guest host liquid crystal shows excellent characteristics compared to the negative type especially when considering stability, reliability, lower driving voltage and a large transmittance ratio, which is a very important factor in this invention. Further, a positive type of guest-host liquid crystal is favorable in avoiding leakage and blurring of light as described above. Thus, this type of material is entirely suitable for full color display in accordance with the invention and particularly black coloring material gives excellent performance of three primary colors reproduction.

Figure 10:
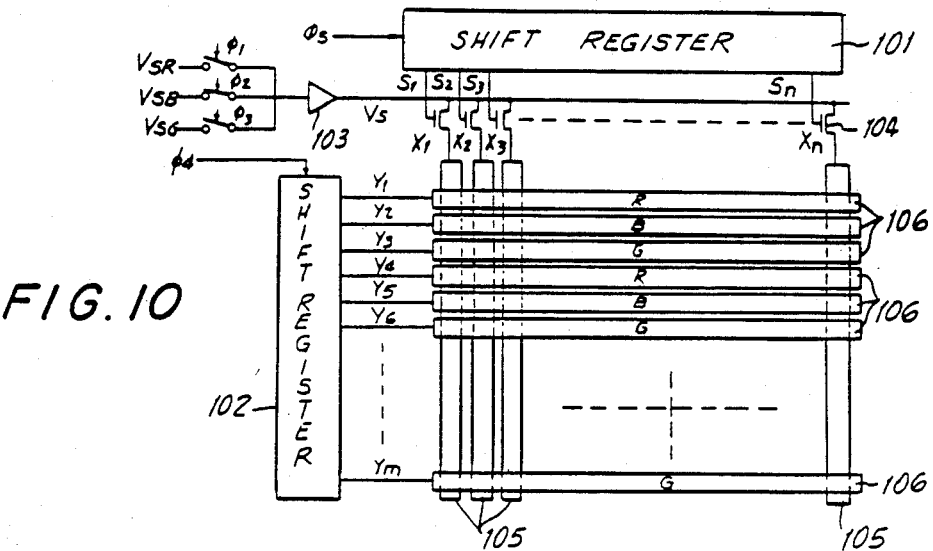
FIGS. 10, 11, 12, 16 and 18 illustrate functional circuit arrangements and driving methods for color filters for use in a liquid crystal display device in accordance with the invention.

FIG. 10 illustrates an exemplary filter arrangement and driving method for a color liquid crystal display using a pointat-a-time method in accordance with the invention. Filters 106 of three primary colors (red R, blue B, green G,) are arranged as stripes extended in a Y direction. Driving electrodes on the sides of the filters are arranged as stripes or all over the surface in the same Y direction as the filters 106. Upper electrodes 105 are arranged in the X direction and divided into every picture element from Xl to Xn. A shift register 101 outputs signals S1...Sn to the transistors 104 in sequence in synchronism with a transmitting clock signal $\phi 5$, and video signals VS are inputted to the elements Xl through Xn successively by activating the associated transistor 104. This is known as a point-at-a-time method.

The shift register 102 selects driving electrodes Yl through Ym successively in synchronism with a clock signal $\phi 4$. For each Y line which is selected, three color signals VSR, VSB, and VSG are selected in synchronism with clock signals $\phi 1$ through $\phi 3$. $\phi 1$, $\phi 2$ and $\phi 3$ having the same pulse width as $\phi 4$, and have a pulse period which is three times as long as the period of $\phi 4$.

In this method, the color filters 106 are arranged in stripes in the Y direction and the frequency for changing over the color signals can be delayed. Thus, the number of lines in the Y direction can be made greater, a superior display resolving power is obtained and a good quality color picture image is reproduced.

Figure 11:
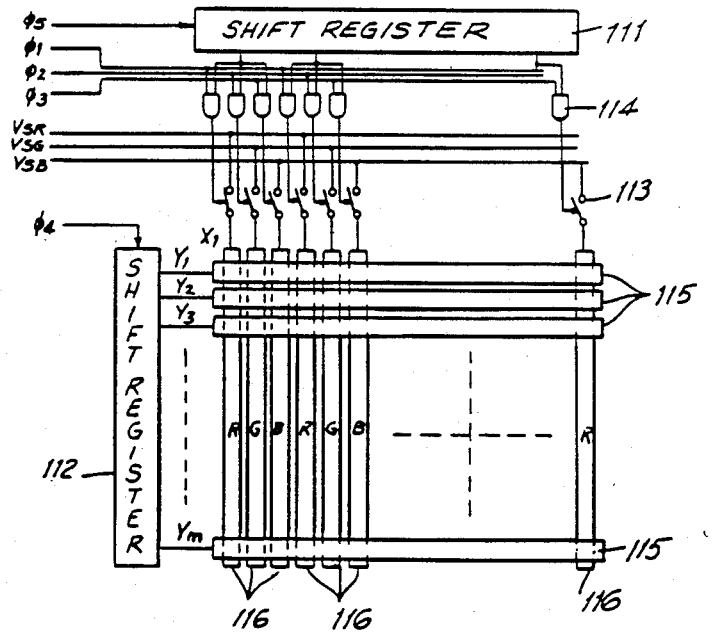

FIG. 11 illustrates an exemplary embodiment of filter arrangement and driving method of a color liquid crystal display in accordance with the invention using the same point-at-a-time method used in FIG. 10. However, the filters 116 are arranged in stripes in the X direction. Thereby, the number of lines in the transverse direction can be made greater and dots become similar to regular squares so that a natural picture image can be produced.

The output of a shift register 112 selects driving electrodes 115 successively in synchronism with signals Yl through Ym. While one of the driving electrodes 115 is selected, a shift register 111 selects successively a unit group comprising red, green and blue filters. Additionally, red, green or blue (R, G, or B) selecting clock signals $\phi1$, $\phi2$ or $\phi3$ are signals formed by dividing a clock signal $\phi5$ into three phases. The color video signals VSR, VSG and VSB are selected successively in synchronism with these clock signals $\phi1$, $\phi2$, and $\phi3$, and are transmitted to the X driving line. In this method, the video signal lines are in parallel with each other according to every color video signal and connected to a sample hold switch 113. Thus, it is advantageous that power consumption of the shift register 111 can be reduced and the shift register is used within a range of its operating speed because the frequency of the transmitting clock $\phi5$ of the shift register 111 is one-third of the number of dots.

Figure 12:
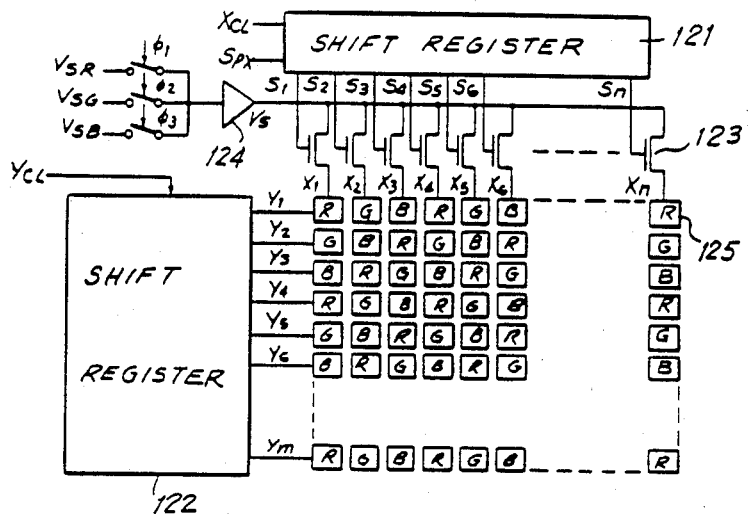

FIG. 12 illustrates an exemplary filter arrangement and driving method of a color liquid crystal display in accordance with the invention wherein respective colors R, G, and B of the color filters are arranged in a mosaic pattern. Each color R, G or B is allocated to a picture element and R, G and B are shifted by one pitch distance to the left in order to bring about a left-down pattern. For example, each picture element (FIG. 12) is driven by signals from X and Y lines constructed on a glass plate as shown in FIGS. 4-8. A shift register 122 for gate lines Y1 ... Ym outputs signals for selecting lines Y1 through Ym successively in synchronism with a clock signal YCL. On the other hand, during a period of selecting one line of the gate lines Y1 ... Ym, a shift register 121 for data lines X1 ... Xn outputs signals S1 through Sn successively to the gates of transistors 123. Then, signals Vs from an amplifier 124 are sampled successively and held on the lines X1 through Xn by actuating the gates of the transistors 123.

Therefore, video signals are transmitted to respective picture elements and a picture image is produced. In the video signal Vs, the respective color signals VSR, VSB and VSG are lmultiplexed in synchronism with clocks $\phi1$ through $\phi3$. Thus, it is necessary that the timing of these clocks $\phi1$ through $\phi3$ correspond with the arrangement of each color filter allocated to the picture element. For instance, during the period of selecting the line Y1, a signal S1 must be applied to the transistor gate in synchronism with the clock signal $\phi1$.

That is, the row corresponding to Y1 begins with a red filter. On the other hand, during the period of selecting the line Y2, the color signal must be applied to the transistor gate in synchronism with the clock $\phi2$ so that the row Y2 begins with a green signal applied to a green filter. In other words, a video signal VSR must be applied to a picture element R and video signal VSG must be applied to a picture element G, and similarly with respect to the blue signals and filters.

Figure 13:
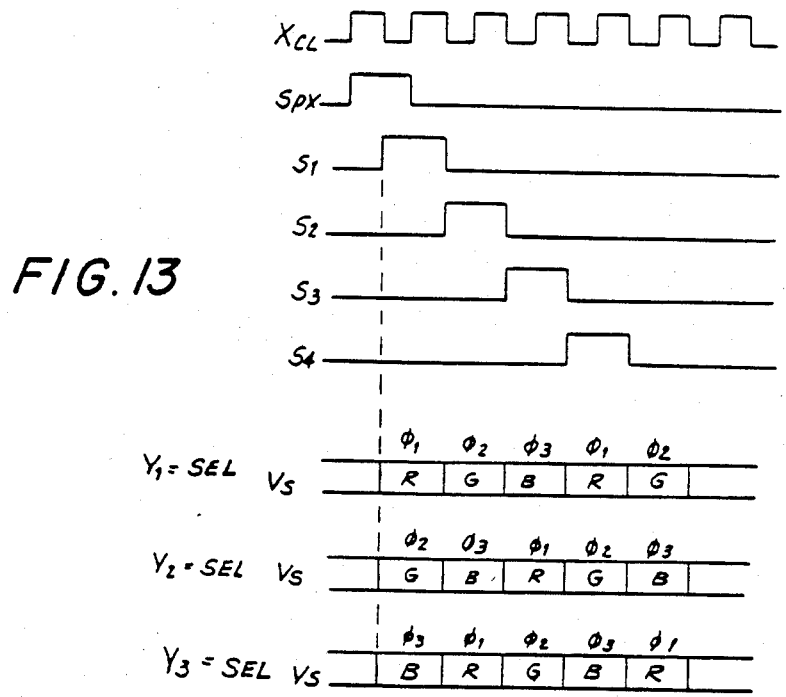
FIG. 13 illustrates operating waveforms associated with the functional circuit of FIG. 12.

FIG. 13 shows signal waveforms associated with the configuration and operation of the display device in accordance with the invention of FIG. 12. When selecting the line Y1, a signal VSR is first supplied to the line X1 in synchronism with the clock signal $\phi1$, while at the same time a sample-hold control signal S1 is applied to the gate of the transistor 123 on the line X1. Second, a color signal VSG is supplied to the line X2 in synchronism with the clock signal $\phi2$ during the period of the samplehold signal S2. Third, a color signal VSB is supplied to the line X3 during the period of applying the sample-hold signal S3.

When, for example, selecting the line Y2, first, the signal VSG, second a signal VSB, third, a signal VSR are supplied to driving electrodes via the lines X1, X2 and X3, respectively, in accordance with the period of supplying the sample-hold controlling signals S1, S2, and S3 to the gates of the transistors 123 on the lines X1, X2 and X3. Thus, it is necessary to shift the clock signals $\phi1$, $\phi2$, and $\phi3$ going from one Y line to the next Y line in order to supply one of the three primary color signals to each driving electrode in correspondence with the three primary color filters arranged in the mosaic pattern.

Figure 14:
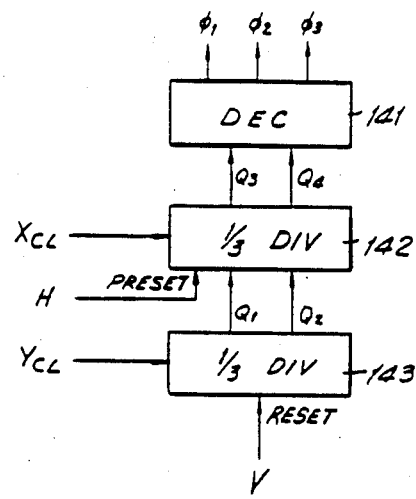
FIG. 14 is a circuit for generating clock signals associated with the circuit of FIG. 12.
Figure 15:
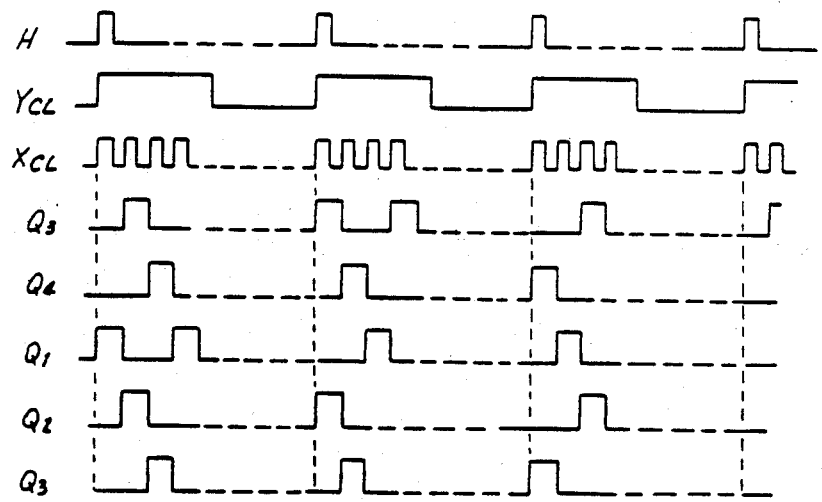
FIG. 15 illustrates waveforms associated with the circuit of FIG. 14.

FIG. 14 illustrates a particular circuit for shifting the phases of the clock signals $\phi1$ through $\phi3$. The circuit of FIG. 14 operates as indicated by the waveforms of FIG. 15. A ½ frequency divider 143 is reset by a vertical synchronizing signal V and outputs signals Q1 and Q2 to a ½ frequency divider 142 in synchronism with a clock signal YCL. The ½ frequency divider 142 divides the inputted signals Q1 and Q2 into ½ in synchronism with an X line clock signal XCL, and loads, that is, presets, the values of Q1 and Q2 every time the horizontal synchronizing signal H is inputted. Therefore, the phases of the outputs Q3 and Q4, applied to decoder 141, are shifted for each clock pulse of the signal YCL. Decoder 141 generates clock signals $\phi1$ through $\phi3$ with proper timing in response to Q3 and Q4. Thus, and respective color video signals are properly applied to the respective picture elements R, G, and B in the circuit of FIG. 12.

Figure 16:
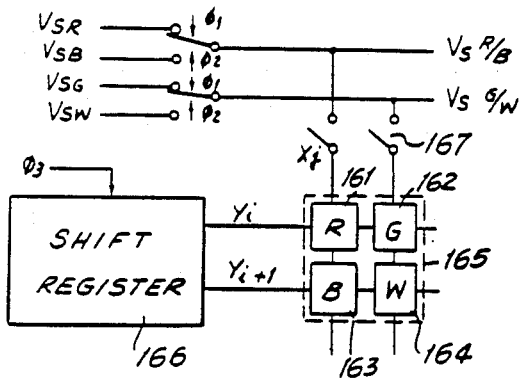

FIG. 16 illustrates another exemplary embodiment of a color liquid crystal device in accordance with the invention wherein filters are arranged in a mosaic pattern. A red filter 161, green filter 162, blue filter 163 and white filter 164 are formed as one block, and a plurality of these blocks are arranged in a matrix. In the situation of low level of light transmission through 3 color filters, there is the problem of getting a poor reproduction of white. In order to solve this problem, a transparent portion 164 is added as a white filter and controlled by an illuminance video signal VSW. Thus, the overall brightness can be improved and a white color is well reproduced.

In this driving method, with regard to the X direction, a shift register controls one block unit of four color filters in the same manner as the circuit of FIG. 11 controls three filters. Additionally, with regard to the Y direction, a gate line Yi or Yi+1 is selected in synchronism with a clock signal $\phi$. The video signals VSR and VSB, or video signals VSG and VSW are alternately applied to picture elements corresponding to each color filter in synchronism with clock signals $\phi1$ and $\phi2$ which have a frequency which is one-half of a clock signal $\phi3$.

Figure 17A:
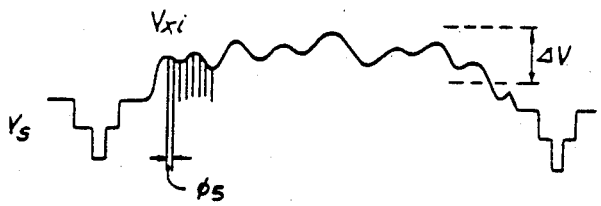
FIGS. 17a, b illustrate the contrast characteristics of a liquid crystal in relation to the applied voltage and a sample-hold operation performed on a video signal.
Figure 17B:
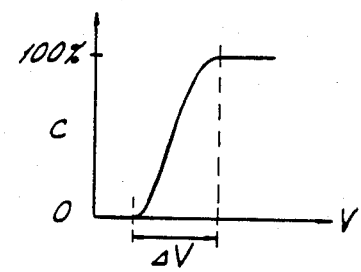

With regard to gray scale display techniques, FIGS. 17a, b indicate how to control voltage amplitude in detail which is described above. The video signal VS illustrated in FIG. 17a is sampled and held in synchronism with a clock signal $\phi5$ and is applied to an X line. The characteristic curve of contrast in relation to applied voltage V has an inclination as indicated in FIG. 17b. Thus, gray scale reproduction can be displayed within the range of $\Delta V$. Additionally, a better quality gray scale reproduction is achieved by implementing $\gamma$ correction or video signal correction in accordance with the characteristics of the liquid crystal material.

The above means of gray scale reproduction through controlling voltage amplitude is mainly adapted to drive an active matrix composed of thin film transistors or non-linear elements, whereas, another technique of gray scale reproduction, that is, controlling or modulating pulse width, is primarily adapted to drive a matrix of high duty cycle multiplex construction, or composed with non-linear elements.

Figure 18:
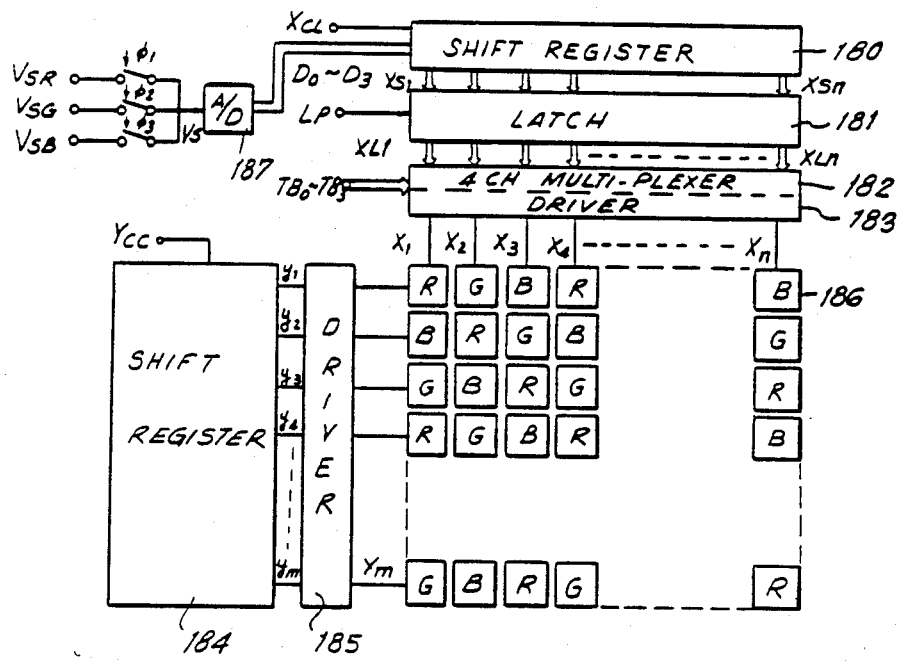
Figure 19:
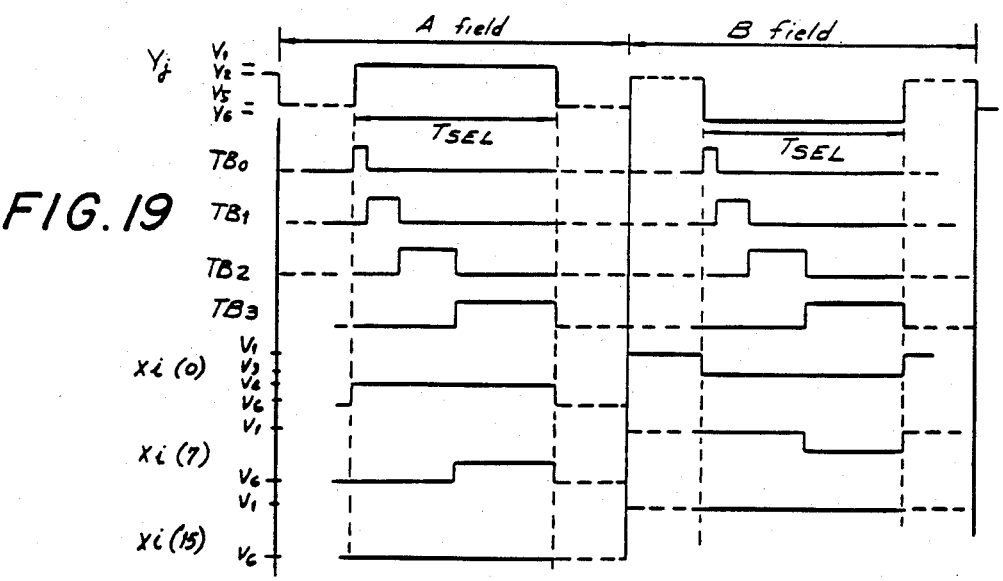
FIG. 19 illustrates waveforms associated with the circuit of FIG. 18.

FIG. 18 illustrates an exemplary construction of a color picture image display panel in accordance with the invention which is driven by a pulse width modulation technique, operating as indicated by the waveforms of FIG. 19. The color filters 186 are arranged as a mosaic with a right-down pattern. For example, in a duty cycle ratio multiplex technique, the driving electrodes are arranged in the manner similar to FIG. 9c. Namely, the X-lines are on the lower baseplate; the Y-lines are on the upper glass baseplate, and the color filters are deposited on either side of the X and Y electrodes.

The respective color video signals VSR, VSG and VSB are multiplexed in synchronism with clock signals $\phi 1$ to $\phi 3$ in a manner as discussed with reference to FIG. 12 and are applied to an analog/digital converter 187 of four bits. The converted outputs $D_0$ through $D_3$ are transmitted to a shift register 180 during the period of selecting a gate line Y, and the converted outputs are supplied to a latch 181 in synchronism with a pulse signal LP. A four-channel multiplexer 182 forms pulses having different pulse widths, where four bits of data select one of several time bases TB0 through TB3. These pulses are supplied to the X-lines X1 to through Xn by way of a driver 183.

On the other hand, on the Y side, the gate lines are selected successively by a shift register 184 and a driver 185 applies the selecting signal to the Y driving electrodes.

With reference to FIG. 19, a frame has a positive field A and a negative field B. The width of the driving pulse Xi is selected within one selection period T SEL. For instance, when the gray scale is zero, the driving waveform is shown as Xi (O). When the gray scale is 7, the driving waveform is shown Xi (7), and when the gray scale is 15, the driving waveform is shown as Xi (15). These driving waveforms are formed by combining times bases TBO through TB3 as indicated by the four-bit data signal.

In a high duty cycle multiplex method of a matrix driving method utilizing non-linear element, the lines on the Y-side are formed by dividing the driving electrodes into respective lines.

On the other hand, in a matrix driving method utilizing a thin film transistor (TFT), a Y selection line is formed on the same base substrate as the X side, and thus, in the liquid crystal driving electrodes on the opposite substrate, a transparent driving electrode film such as ITO (indium-tin-oxide), or a transparent conductive film is deposited all over the surface of the opposite substrate. Thus, when a TFT panel is formed as illustrated in FIG. 9, the transparent driving electrode film covers the color filter entirely. Accordingly, this construction removes a problem that the dyed layer in the color filter and the liquid crystal layer interact with the each other and the reliability of both layers is reduced. The construction where the transparent driving electrode film entirely covers the color filters eliminates this problem because the transparent electrode film shields the dyed layer from the liquid crystal layer. This is a great advantage for a TFT panel in that the transparent electrode film serves as a passivation film for the color filter layers.

Figure 20A:
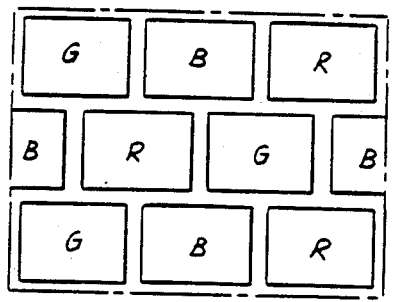
FIGS. 20a, b, illustrate fundamental constructions of high resolving power picture elements in accordance with the invention.
Figure 20B:
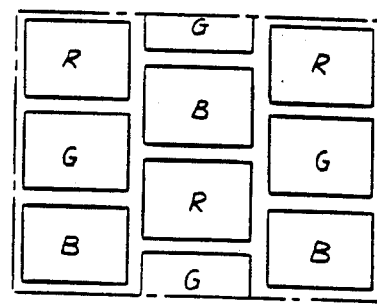

In a practical color display, a major problem sometimes occurs with regard to resolving power. The methods of arranging color filters in a mosaic pattern and for improving the resolving power are now described. FIG. 20 illustrates a fundamental concept showing an arrangement of picture elements in accordance with the invention. FIG. 20a illustrates a technique wherein the color filters are arranged by being shifted in adjacent rows by ½ of the pitch distance between filters in the X direction. FIG. 20b shows a technique wherein the color filters are shifted by ½ of the pitch distance in the Y direction. The resolving power of the described arrangements of picture elements is improved for viewing in an oblique direction. Therefore, even with a monochromatic display, or a graphic display, oblique lines do not appear unnaturally. Favorable visual resolving power can be substantially obtained with this arrangement where very few picture elements are used.

Additionally, in a multi-color display, the color filters R, G and B are arranged repeatedly as positioned at each apex of a triangle on a plane. Thus, a properly satisfactory resolving power is obtained by this arrangement where few picture elements are used.

Figure 21:
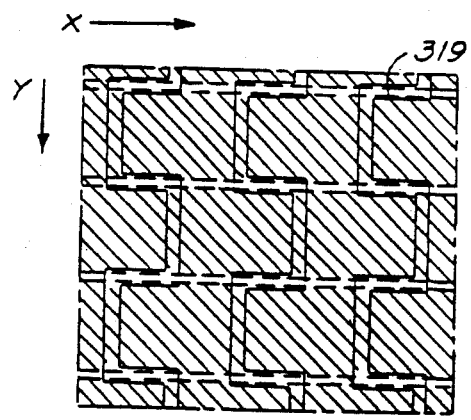
FIG. 21 is the construction of a driving electrode in a multiplex driving system in accordance with the invention.

FIG. 21 illustrates a construction of driving electrodes in a multiplex driving system in accordance with the invention. X electrodes 319 are arranged and shifted by ½ pitch distance for a pattern as shown in FIG. 20a. The X and Y electrodes are normally composed as transparent conductive electrodes, and sometimes, wiring materials of very small width, which are made of a metallic thin film, are deposited so as to lower the wiring resistance, if necessary.

FIG. 22a shows an arrangement of filters and electrodes for improving resolving power by utilizing TFT in accordance with the invention. The arrangement includes data lines 213–215 and gates lines 210–212. A transistor and a picture element electrode are conventionally arranged for the odd numbered, that is, every other gate line as shown with the transistor 216 and the picture element electrode 217. On the other hand, in the even numbered gate lines, transistors 219 and 222, and picture element electrodes 221 and 223 are arranged in parallel with each other on opposite sides of the data line 214. In other words, there is substantially a ½ pitch distance shifting. This example of FIG. 22a illustrates a case wherein the data lines 213–215 and the driving electrodes 217, 220, 221 and 223 are formed in the same layer, or on the same layer. In a construction where the data line and the driving electrode may overlap, it is also possible to shift the picture element electrode 224 itself by ½ pitch distance with a single transistor 225 as illustrated in FIG. 22b.

FIG. 23 shows another alternative embodiment wherein TFT is utilized in accordance with the invention. Therein, shifting of the data lines 230–232 by ½ pitch is achieved by making the lines themselves zig-zag. It is advantageous in that the unnaturalness caused by shifting electrodes by ½ pitch distance is removed, because the size of the picture element is substantially the same in both shifted portions and non-shifted portions.

Figure 24:
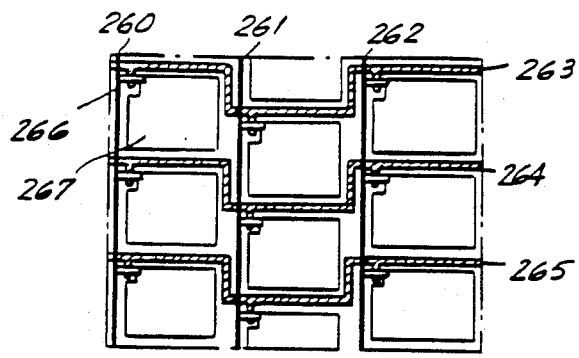

FIG. 24 illustrates a technique of shifting the driving electrodes by ½ pitch distance in the Y direction by making the gate lines with a zig-zag pattern.

Figure 25:
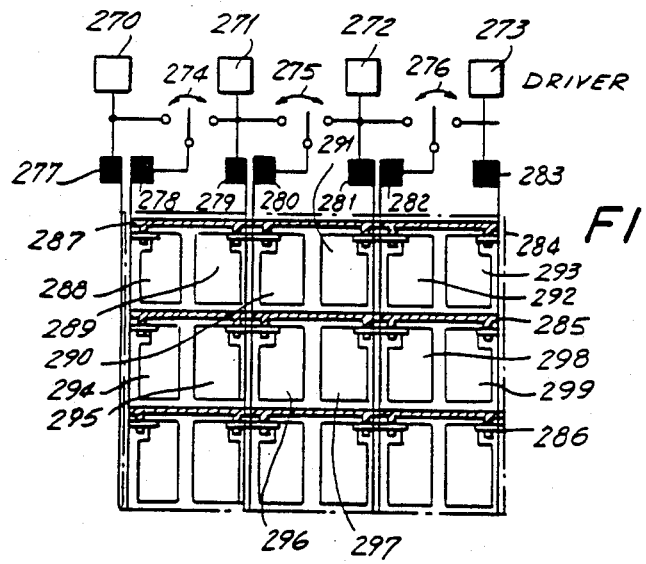

FIG. 25 is another alternative embodiment of a liquid crystal device in accordance with the invention wherein TFT are utilized. Drivers 270–273 are directly connected to data lines 277, 279, 281 and 283. The data lines 278, 280, 282 are alternately connected to the right hand or the left-hand driver with every scanning of one gate line. For instance, when the TFT are turned on by the gate line 284 and the switches 274-276 are set to the left, the same data is supplied to both picture elements 289 and 290, and 291 and 292 as pairs, respectively. Then, when the TFT are turned off by the gate line 284 and are turned on by the gate line 285, the switches 274-276 are set to the right, the same data is respectively supplied to both elements of three pairs of picture elements 294, 295, 296 and 297 and 298 and 299. Thus, a mosaic similar to that shown in FIG. 20a is achieved.

Figure 26:
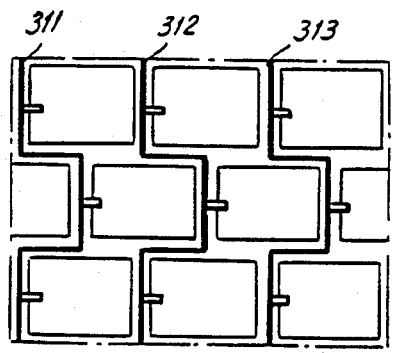
FIG. 26 illustrates a high resolving power picture element using a non-linear element in a construction in accordance with the invention.

FIG. 26 illustrates a mosaic construction as in FIG. 20a, wherein the X data lines 311, 312, 313 are wired in a zig-zag pattern.

As stated above, a color display in accordance with the invention, can be achieved by combining a color filter with a driving method for a large number of dots such as a high duty cycle ratio method, a multiplex driving method, or a driving method wherein a thin film device, such as a non-linear element or a thin film transistor, is utilized, and the like. A light transmission type display can be utilized when power consumption is not severely limited. A light reflection type display wherein a plane of reflection is deposited on the lower side can be utilized where low power consumption is required. A color display in accordance with the invention is advantageous as compared with cathode ray tube of the same quality picture in that a full color display composed of more than $100 \times 100$ lines can be achieved with excellent image quality and without distortion, with a compact physical unit and low power consumption in reproducing graphic or picture images.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A liquid crystal display device having a plurality of picture elements arranged in a matrix of columns and rows, each of said picture elements comprising:
   a first substrate and a second substrate, said substrates facing each other and spaced apart for defining a space therebetween;
   a first electrode formed on the surface of said first substrate facing said second substrate;
   a color filter and a second electrode formed on the surface of said second substrate facing said first electrode and said first substrate;
   each color filter on the second substrate having an area greater than the area of the first electrode on the first substrate with the second electrode formed on the surface of the color filter; and
   a liquid crystal material filling the space between said electrodes and retained in said space.

2. A liquid crystal display device as claimed in claim 1, further including a data line and intermediate component means for connecting the data line to said first electrode through the intermediate component means, said intermediate component means being one of a thin film transistor and non-linear elements, said intermediate component being formed on said first substrate on the same surface with said first electrode.

3. A liquid crystal display device as claimed in claim 2, wherein said non-linear element is one of diodes connected oppositely and a MIM element.

4. A liquid crystal display device as claimed in claim 2, wherein all said color filters are formed on the same second substrate, and all said first electrodes are formed on the same said first substrate.

5. A liquid crystal display device as claimed in claim 2, wherein said electrodes are transparent.

6. A liquid crystal display device as claimed in claim 2, wherein said color filters represent three primary colors, each said first electrode having a shape similar to that of the opposed color filter.

7. A liquid crystal display device as claimed in claim 6, wherein said primary color filters are arranged in said matrix in a pattern of one of stripes of a first color adjacent to stripes of two other colors and a mosaic of colors.

8. A liquid crystal display device as claimed in claim 7, wherein said pattern is a mosaic, the centers of the picture elements in one row being shifted by a selected distance from the centers of the picture elements in the next adjacent row.

9. A liquid crystal display device as claimed in claim 8, wherein said selected distance is ½ of the distance between centers of adjacent elements in the same row.

10. A liquid crystal display device as claimed in claim 7, wherein said pattern is a mosaic, the centers of picture elements in a column being shifted by a selected difference from the centers of picture elements in the next adjacent column.

11. A liquid crystal display device as claimed in claim 10, wherein said selected distance is ½ of the distance between centers of adjacent elements in the same column.

12. A liquid crystal display device as claimed in claim 1, wherein said color filters represent three primary colors, each said first driving electrode having a shape similar to that of the opposed color filter.

13. A liquid crystal display device as claimed in claim 12, and further comprising a passivation layer formed on said color filters between said color filters and said second driving electrode, said passivation layer preventing interaction between said filters and said electrode materials.

14. A liquid crystal display device as claimed in claim 13, wherein said first and second substrates are glass, and said passivation layer is SiO2.

15. A liquid crystal display device as claimed in claim 1, wherein said color filters are formed of a water soluble organic resin colored with a coloring material.

16. A liquid crystal display device as claimed in claim 15, wherein said organic resin is one of polyvinyl alcohol and gelatine.

17. A liquid crystal display device as claimed in claim 1, wherein a layer of glass separates said color filters from said second electrode.

18. A liquid crystal display device as claimed in claim 1, wherein said color filters represent three primary colors and white, said picture element being arranged in blocks of four including said primary colors and white.

19. A liquid crystal display device as claimed in claim 1, wherein said first and second substrates are transparent.

20. A liquid crystal display device as claimed in claim 1, wherein said color filter is formed directly on the surface of said second substrate and said second electrode covers said color filter.

21. A liquid crystal display device as claimed in claim 1, wherein said second driving electrode is disposed directly on adjacent to said second substrate and said color filter covers said second driving electrode.

22. The liquid crystal display device of claim 1, wherein the second electrode is a portion of a common electrode of the device which covers a plurality of the color filters of the picture elements of the matrix.

23. A liquid crystal display device having a plurality of picture elements arranged in a matrix of columns and rows, each of the picture elements comprising:
- a first substrate and an opposed spaced apart second substrate for defining a space therebetween;
- a first electrode on the surface of the first substrate facing the second substrate;
- a color filter and a second electrode on the surface of the second substrate facing the first electrode and the first substrate;
- a liquid crystal material filling the space between the electrodes and retained in the space; and
- means for reducing the leakage of incident light in the regions between the first electrodes of adjacent picture elements of the matrix.

24. The liquid crystal display device of claim 23, wherein the means for reducing the leakage of incident light includes a color filter on the second substrate having an area greater than the area of the first electrode on the first substrate.

25. The liquid crystal display device of claim 23, wherein the means for reducing the leakage of incident light includes a black frame between picture elements of the matrix.

26. The liquid display device of claim 25, wherein the black frame is a black pigment disposed between adjacent color filters of the matrix.

27. The liquid crystal display device of claim 25, wherein the black frame is a black pigment disposed between adjacent first electrodes of the matrix.

28. The liquid crystal display device of claim 25, further including a plurality of parallel and spaced apart data lines on the first substrate adjacent to the first electrodes, polarizers disposed on the outer surfaces of the substrates with the axes of polarization substantially perpendicular to each other and circuit means including means for applying a voltage to the liquid crystal material and the means for reducing leakage of incident light includes means for continually applying a video signal to the data lines so that the data lines appear black to a viewer.

* * * * *